United States Patent [19]
Ellis et al.

[11] Patent Number: 5,604,184
[45] Date of Patent: Feb. 18, 1997

[54] CHEMICALLY INERT RESIN COATED PROPPANT SYSTEM FOR CONTROL OF PROPPANT FLOWBACK IN HYDRAULICALLY FRACTURED WELLS

[75] Inventors: Patrick D. Ellis, Kingwood; Billy W. Surles, Houston, both of Tex.

[73] Assignee: Texaco, Inc., White Plains, N.Y.

[21] Appl. No.: 419,498

[22] Filed: Apr. 10, 1995

[51] Int. Cl.$^6$ .................................................. E21B 43/267
[52] U.S. Cl. ..................... 507/117; 507/924; 507/923; 507/922; 166/300
[58] Field of Search ...................................... 507/117, 924

[56] References Cited

U.S. PATENT DOCUMENTS 4,169,818  10/1979  DeMartino et al. ................ 260/17 R
5,439,059  8/1995  Harris et al. ........................ 507/924

Primary Examiner—David B. Springer
Attorney, Agent, or Firm—Kenneth R. Priem; James L. Bailey; Cynthia L. Hunter

[57] ABSTRACT

Disclosed is an improvement in a method for propping a fracture adjacent a wellbore formed by injecting in said fracture a carrier fluid containing proppant coated with a curable resin which improvement comprises:

a) using proppant coated with a resin fluid containing a polymerizable oligomer of furfuryl alcohol resin, a catalyst comprising an oil soluble, slightly water soluble organic acid and an ester of a weak organic acid to consume water produced by the polymerization of resin;

b) using as a carrier an aqueous saline fluid comprising water which is 70% to 100% saturated with sodium chloride, c) suspending said resin-coated proppant in the carrier fluid, forming a fluid mixture of resin-coated proppant and carrier fluid; and injecting said mixture into said fracture, wherein the timing of the addition of the catalyst can be varied.

18 Claims, No Drawings

CHEMICALLY INERT RESIN COATED PROPPANT SYSTEM FOR CONTROL OF PROPPANT FLOWBACK IN HYDRAULICALLY FRACTURED WELLS

FIELD OF THE INVENTION

This invention relates to the use of proppants in fractures about a well penetrating a subterranean formation. More particularly, this invention relates to resin-coated proppants that are injected into fractures in a subterranean formation under conditions such that the proppants will set up or cure, consolidate, remain in place, and resist closing of the fracture or flowing back into the wellbore. Still more particularly, this invention is related to resin-coated proppants, which when set up and cured, are completely inert and thermally stable in all oilfield environments.

BACKGROUND OF THE INVENTION

The technique of hydraulic fracturing is well known in the art as a means of increasing producing rates from oil and gas wells. The use of resin-coated proppants is also known.

Hydraulic fracturing of a formation adjacent a wellbore increases productivity of desirable hydrocarbon fluids from the subterranean formation by creating channels of high conductivity.

The technique normally involves (1) injecting a fracturing fluid through a well and into the formation at a sufficient rate and pressure to overcome the earth stresses and form a crack (fracture) in the formation; and (2) placing a particulate material(propping agent) in the formation to maintain the fracture in a propped condition when the injection pressure is released. The propped fracture thus provides a highly conductive channel in the formation. The degree of stimulation afforded by the hydraulic fracture treatment is largely dependent upon the permeability and the width of the propped fracture.

Often the fracturing fluid is a viscous liquid. Fracturing fluids used in conventional hydraulic fracturing techniques include: fresh water, brine, liquid hydrocarbons (e.g., gasoline, kerosene, diesel, crude oil, alcohols and the like) and foams which are viscous or have gelling agents incorporated therein, gelled water, gelled brine and gelled oils, to name a few. The fracturing fluid will also typically contain the particulate proppant material in a portion of the total volume of the fracturing fluid. The proppant flows into and remains in the fissures which are formed and/or enlarged during the fracturing operation. The proppant operates to prevent the fissures from closing completely and thus facilitates the flow of formation fluid through the fissures and into the wellbore.

Examples of particulate materials commonly used as proppants in fracturing include: sand, glass beads, nut shells, metallic pellets or spheres, gravel, synthetic resin pellets or spheres, gilsonite, coke, sintered alumina, sintered bauxite, other ceramic materials, mullite, like materials, and combinations thereof.

The fracturing fluid is pumped into the formation under a pressure sufficient to enlarge natural fissures in the formation and/or open up new fissures in the formation. Packers can be positioned in the wellbore as necessary to direct and confine the fracturing fluid to the portion of the well which is to be fractured. Typically, fracturing pressures range from less than 1,000 psi to over 15,000 psi depending upon the depth and the nature of the formation being fractured.

A properly designed hydraulic fracture treatment places a desired amount of proppant in the formation to hold open the hydraulically created fractures. One of the major difficulties encountered in fracturing is proppant flowback. This decreases the amount of proppant holding the fractures open, allowing closing of the fractures and causing reduced permeability. As production rates increase, proppant flowback into the wellbore and to the surface can occur. Proppant flowback can reduce fracture conductivity and restrict production, erode tubulars and wellhead equipment as well as surface facilities, and can fill treating vessels causing failure of the treating process.

A number of procedures such as placing a screen and liner, using precoated curable resins, adding resins on the fly, and forced closure have been used to reduce the proppant flowback problem. To date, nothing has been found to control all situations and as deeper, hotter wells are treated, the limits of current resin coatings are exceeded.

Resin-coated proppants which have the ability to consolidate have the potential to minimize this problem. They also possess other properties which are advantageous in a proppant. For example, it is desirable that the proppants have relatively high strength so as to resist crushing of the proppant when consolidated. Also, the proppant needs to be compatible with the fracturing fluids used to carry it downhole.

Resin-coated proppants are currently used in many fracturing treatments. The coated materials can be manufactured away from the well site and delivered to the well location or the coating can be added to the proppant on-site by adding required resin material to the fluid so that the coating occurs while the proppant is being pumped, or even after the proppant is pumped downhole.

Failure of resin-coated proppants can occur for a number of reasons. In addition, to the interactions that can occur with the fracturing fluid and its additives, reaction with natural brines, $CO_2$ and production treating chemicals can further degrade resin strength over time. High temperature accelerates the chemical degradation, and high temperature alone can degrade the resins currently in use.

U.S. Pat. No. 4,785,884 discloses a proppant coated with a solid thermosetting resin that can consolidate and cure at temperatures below about 130° F.

In U. S. Pat. Nos. 4,585,064 and 4,717,594 there are disclosed high strength self-consolidating particles comprised of a particulate substrate, a substantially cured inner resin coating and a fusible curable outer resin coating.

In U.S. Pat. No. 5,048,608, there is disclosed a proppant consolidating fluid mixture for use in hydraulic fracturing which contains a quasi polyurethane prepolymer, a diluent, and a diol. This system can be cured at low temperatures.

Well treatment methods for continuously forming and transporting consolidatable resin coated particulate material are disclosed for example, in U.S. Pat. Nos. 5,128,390 and 4,336,842. Hardenable resin systems are also disclosed in U.S. Pat. Nos. 4,199,484; and 4,665,988.

In U.S. Pat. Nos. 4,664,819; 4,564,459 and 4,443,347, there is disclosed pre-cured proppants and methods for employing them to prop a fracture.

In U.S. Pat. No. 4,427,069, there is disclosed a method for consolidation of sand naturally existing in an earth formation adjacent a producing well, utilizing as a polymerizable resin, a furfuryl alcohol oligomer, which produced a strong and durable resin bonding the sand grains together while maintaining sufficient permeability to permit the production of fluid from the formation. In U.S. Pat. No. 4,428,427, there is disclosed a gravel pack employing a similar resin to precoat gravel or other particulate matter and introduce fluid comprising the suspended granular material into the washed-out zone or cavity adjacent to the producing well.

With the resin-coated proppant systems now available in the art, a problem which contributes to proppant flowback is that the systems may not allow sufficient time for the curable resin coated proppants to come together before the resin cures and the proppants cannot bond together to properly form a three dimensional matrix. Particularly in low permeability, high temperature formations, the time required for close contact can be longer than the time to set. These problems are even more apparent with the increasing demand to perform hydraulic fracturing in hotter, deeper wells.

In an SPE publication, SAND CONTROL, Vol. 1, Henry L. Doherty Series, Ch. 11, 1992, there is an article titled, "PLASTIC CONSOLIDATION PRINCIPLES", by W. L. Penberthy, Jr., and C. M. Chaughnessy, in which it is stated at page 67 that the upper temperature useful for polymers known in the field of hydraulic fracturing is about 300° F. In the same publication, at page 76, it is stated that furans or phenolic furans are very reactive . . . and no method is available to control them internally, such as, for example, in a well. This would appear to summarize the prevalent view of the art in this field. That is, that resin-coated gravels have potential for minimizing proppant flowback and that furan resins might be very useful, but they are unmanageable above about 300° F.

It would fill a need in the art if there were a hydraulic fracturing system available which used curable resin coated proppants which would be essentially inert to strong chemicals used in wells and stable at high temperatures. It would also be very valuable in the art if the cure times could be tailored to suit various conditions.

SUMMARY OF THE INVENTION

In accordance with the foregoing the instant invention is directed to a resin system for coating proppants to use in hydraulic fracturing applications, for controlling the set time of resin-coated proppants in fractures, even at high temperatures, and for minimizing proppant flowback. The invention is a method for consolidating proppant particles injected into a hydraulic fracture adjacent a wellbore for increasing permeability and producing to the earth's surface hydrocarbon fluids which comprises:

a) fracturing about the well penetrating into the subterranean formation to form fractures for increased production of hydrocarbon fluids;

b) injecting a fracturing fluid containing proppant particles coated with an oligomer of furfuryl alcohol, an oil soluble slightly water soluble organic acid, and an alkyl alkanoate to consume water produced by the polymerization of the oligomer suspended in a carrier fluid comprising water which is from 70% to 100% saturated sodium chloride;

c) forming a fluid mixture of resin-coated proppant particles and carrier fluid;

d) introducing the fluid mixture comprising the oligomer coated proppant suspended in the aqueous saline carrier fluid into the fracture and e) forming cured consolidated particles in the fracture to prop the fracture open.

This system has several important benefits not offered by existing systems. First, the system is completely chemically inert and thermally stable in all oil field environments once set. Further, when this system is set and cured it is impervious to chemical attack by solvents, acids, $CO_2$ or other common oil field chemicals. The system is stable at temperatures well above 300° F., which is the approximate limit of existing systems, to as high as 700° F. The desirable properties are also observed at temperatures as low as 60° F.

In addition, this system provides significant commercial advantages over current resin systems due to the flexibility of applying the resin to the proppant. The proppant can be precoated, coated "on the fly", or coated in a post treatment.

DESCRIPTION OF THE PREFERRED EMBODIMENT

In a preferred embodiment of the present invention the proppant, which is generally sand, is coated with furfuryl alcohol oligomer and, along with an alkyl acetate, which is preferably butyl acetate, and a slightly soluble organic acid, such as nitrobenzoic acid, is forced into the well in a carrier fluid. The furan resin crosslinks and fuses, forming an insoluble three-dimensional permeable matrix which is porous to the oil or gas. The carrier fluid containing acetate can return back out of the well. This is discussed in more detail under "Experimental" and Hypothetical Pilot Field Example".

The first step in the instant invention is obtaining a suitable particulate material. This can include any of the materials listed above in the "Background" but for our purposes the term proppant will be used to refer to any particulate solid material which is stable at the conditions that will be encountered in the producing formations over a long period of time. For our purposes, it is only necessary that the granular material be hard, rigid, generally spheroidal particles of material which are substantially inert to crude oil, natural gas, water, brine and other fluids naturally present in subterranean formations and producing wells, as well as to fluids commonly injected into subterranean petroleum formations for the purpose of stimulating oil production.

Proppants can be selected from the group consisting of sand, glass beads, nut shells, metallic pellets or spheres, gravel, synthetic resin pellets or spheres, gilsonite, coke, sintered alumina, sintered bauxite, other ceramics, mullite, and combinations thereof.

As a practical matter, naturally occurring particulate materials such as small pebbles, gravel or sand are often used. The particle size distribution is not critical and any size proppant can be used. The preferred proppant has a predominant portion of its particle size in the range from 8 to 70 mesh, with the actual distribution further restricted based on the well to be treated.

Generally no special pretreatment of the proppant will be required prior to subjecting it to the various treatments to be described below, although if the proppant is seriously contaminated with oil or other materials, it should be washed by some suitable means to remove the oily materials from the surface which might interfere with the proper coating of the various fluids.

The resin system preferably comprises from 60.0 to 90.0 percent by weight resin in its commercial form, 15 to 30 percent by weight ester, such as butyl acetate, and from 1.0 to 5.0 percent by weight o-nitrobenzoic acid. A preferred method of formulating this solution is to mix the acid with the ester and then mix four parts of the resin emulsion with one part of this mixture of ester and acid.

Suitable acetates include alkyl alkanoates, such as, for example, ethyl acetate, methyl acetate, propyl acetate and butyl acetate.

The internal catalyst used to catalyze polymerization of the resin is an oil soluble, very slightly water soluble organic acid. Representative of oil soluble, very slightly water soluble organic acids are, nitrobenzoic acid, toluene sulfonic acid, oxalic acid, and benzoic acid. The preferred acid is o-nitrobenzoic acid. From 0.05 to 5.0 and preferably from 1.0 to 4.0 percent by weight of the slightly water soluble organic acid catalyst is incorporated in the resin solution used to coat the proppant particles with resin.

If proppant coated with this resin were suspended in an aqueous medium, the coated particles would begin sticking together immediately, which would interfere with pumping the slurry of a resin-coated proppant down the well and the placement of the coated particles in the desired fracture. It is preferred to neutralize the catalytic activity, but only on the surface of the resin-coated particles, using a material which can be removed after the particles are in place in the fracture to allow the polymerization of resin to continue between adjacent resin coated proppant particles to form the bonded three-dimensional matrix. A volatile base such as ammonia is used for this purpose. To ensure that the effect is restricted to the surface of the resin coating, the ammonia is incorporated in the carrier fluid used to suspend the coated proppant particles until they have been placed in the formation cavity.

The resin solution and the proppant are mixed together. It is preferred that the volume ratio of proppant to resin solution is from 10 to 30, and preferably 15.0 to 25.0. The proppant and resin emulsion are mixed until the proppant particles are thoroughly coated. The appearance and texture of the material produced by the above procedure is a wet, tacky mass of coated proppant particles. No drying step is utilized because drying equipment would be complicated and expensive to employ in the oil field, and is not needed if the proper carrier fluid is used. The material is much too plastic to permit injection into a wellbore without mixing with some type of carrier fluid. Merely adding the resin coated proppant particles to water would result in removal of some of the resin, which would greatly reduce the effectiveness of the process and reduce the strength of the polymerized proppant pack. An oil base fluid would not be preferred since the oil would dissolve in the resin coating, rendering it more tacky and reducing the ultimate strength of the polymerized proppant pack. We have discovered that if essentially saturated salt-water is utilized, the resin coating is maintained in the desired state while it is being transported down the injection means of the producing well and placed in the fractures and fissures adjacent the producing well. The high salt content stabilizes the tacky resin-coated proppant particles, dewatering them to a limited extent by osmosis and prevents premature sticking together of the resin-coated proppant particles. Salt content from 70 percent saturated to 100 percent saturated may be employed, but the best results are achieved if the carrier fluid is essentially saturated with respect to sodium chloride at surface ambient temperature.

In some instances, improved results are obtained if a viscosifying amount of a hydrophilic polymer is added to the saturated salt water employed as a carrier fluid in practicing the process of our invention. The preferred polymer for this purpose is hydroxyethyl cellulose, a nonionic ether of cellulose which is soluble in hot or cold water, but is insoluble in organic solvents. It is stable in concentrated salt solutions and is nontoxic. The material is available commercially under several trademarks, including NATROSOL available from Hercules Inc. of Wilmington, Del. Applicants have found that the preferred Hercules product for this purpose is sold as NATROSOL 250 HHR. The 250 designation on this trademark indicates a hydroxyethyl moler substitution of 2.5 and the HHR is an indication of the viscosity type.

Other types of viscosifying hydrophilic polymers may be utilized, such as natural gums, or chemically modified natural polymers such as carboxymethyl cellulose, methyl cellulose, polyvinyl alcohol, ethylene oxide, etc. Any of the hydrophilic polymers normally utilized for oil recovery operations may be utilized provided they are suitable for use in high salinity environments such as are encountered in this application.

Applicants have also found that the viscosity enhancing agent is benefited by incorporation of fluorescent dyes or optical brighteners. For reasons that are not entirely understood, the viscosity of a solution of hydroxyethyl cellulose is increased significantly if the fluid also contains a small amount of fluorescent dye material. Commercial products suitable for this purpose include UNITEX RSB® or TINOPAL CVS by Ciba-Geigy Corporation of Ardsley, N.Y. TINOPAL CVS is a distyryl biphenyl derivative, specifically 2,2'-1,1'-biphenyl-4,4'-diyldi-2,1-ethenediyl) bisbenzenesulfonic acid, disodium salt. These particular dyes are anionic and have a solubility in distilled water of 25 g/l at 25° C., and 300 g/l at 95° C. These and other commercially available fluorescent dyes increase the viscosity of solutions of hydroxyethyl cellulose by a substantial degree, especially if the fluid pH is carefully controlled to the range of from 6 to 8. Another useful dye material which applicants have found to be suitable for this purpose is marketed under the trademark BLANCOPHOR SV by BASF-Wyandotte.

Generally we have found that the desired viscosity sufficient to support the resin-coated proppant particles is obtained by using from 0.2 to 1 percent by weight hydroxyethyl cellulose and from 0° 8 to 1.2 percent by weight fluorescent dye. Persons skilled in the art of preparing and using such fluids will of course recognize that more polymer is required to give the desired viscosity at relatively higher temperatures, and adjustments within the above range may be made as necessary. The objective of incorporating the viscosifying amount of hydrophilic polymer and the carrier fluid of our invention is to support the resin-coated particles and to ensure that minimum abrasive removal of resin from the proppant particles occurs during the time that the fluids are pumped down the injection means to the fracture adjacent the subterranean well.

In a preferred mode a solution is prepared that contains about 80 percent resin and 19 percent butyl acetate and from 0.8 to 1.2 percent acid catalyst such as o-nitrobenzoic acid. Proppant and the resin solution are mixed to produce resin coated proppant, which is then added to a carrier fluid which is water saturated or nearly saturated with sodium chloride which also can contain a viscosifying amount of hydrophilic polymer, preferably hydroxyethyl cellulose and about 0.1 percent fluorescent dye. The amount of resin-coated gravel in the carrier fluid is in the range of 0 to 18 lbs./gallon. The high salt content promotes loss of water from the resin coating the proppant prior to placement of the resin-coated proppant in the desired location in the fracture, and also avoids washing the resin off the proppant. The presence of the viscosifying polymer in the aqueous carrier medium reduces abrasive contact between the resin-coated proppant particle and prevents or reduces settling of the coated proppant during the placement process.

Any acid catalyzed polymerizable resinous material which can be used to coat the proppant particles, and then be suspended in the carrier fluid for placement in the formation cavity can be used in our invention. A particularly preferred resin is the furfuryl alcohol oligomer $(C_4H_3OCH_2)_xH$, which is a relatively inexpensive polymerizable resin which auto-polymerizes upon exposure to acid catalyst forming a thermosetting resin which cures to an insoluble mass highly resistant to chemical attack and thermal degradation. Specifically it is recommended that the resin used be Quacorr 1300 available from Q. O. Chemical, Inc., 2801 Kent Avenue, P.O. Box, 2500, West Lafayette, Ind. 47906. This particular resin is favored because it is oil soluble.

The furfuryl alcohol oligomer may be desirably diluted with an appropriate solvent such as butyl acetate to decrease viscosity of the fluid such that it can be manageably used to coat the proppant.

As the furfuryl alcohol oligomer comes into contact with the acidic catalyst, the action of the heat in the formation and catalyst drives the auto-polymerization reaction forward. Thus, the alcohol oligomer polymerizes to a resin mass.

As the polymerization reaction proceeds, water is produced as a by-product. If this water production is allowed to go unchecked, the polymerization reaction will soon equilibrate:

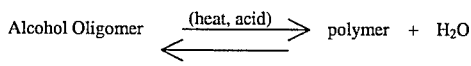

By providing an ester of a weak organic acid in the reaction mixture, the by-product water is consumed in a hydrolysis reaction of the ester to its corresponding alcohol and carboxylic acid. For example, the inclusion of an ester of a weak organic acid, widely available as inexpensive organic solvents, with the polymerizable resin composition serves both as the solvating agent for the polymerizable resin and as an ester to check water production. Accordingly, the polymerization reaction is driven to the desired degree of completion by the uptake of water in the ester hydrolysis reaction:

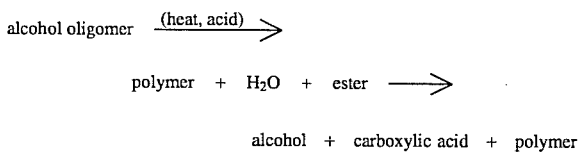

The amount of resin coated on the proppant as a percent of the weight of proppant and resin is from 2 to 10 percent and the catalyst content as a percent of resin is from 1.0 to 5.0 percent. These concentrations can of course be varied depending on individual characteristics of the selected resin and catalyst as well as conditions encountered in the particular application.

The fracturing method can be conducted in generally the same manner as any of several conventional hydraulic fracturing procedures. The treating composition is pumped into the formation under a pressure sufficient to enlarge natural fractures in the formation and/or open up new fractures in the formation. As the treating composition is pumped into the formation, the proppant blend contained in the treating composition remains in the fractures which are formed and/or enlarged during the fracturing operation. The deposited proppant blend operates to (a) prevent the formation fractures from closing, (b) provide a high permeability flow path to the wellbore and (c) prevent the migration of formation gravel and fines through the formation fractures.

The volume of resin-coated proppant necessary to prop the fracture depends upon the formation permeability and the length, height, and width of the fracture to be propped. This cannot be known with great precision, although persons skilled in the art of performing hydraulic fracturing are familiar with the probable volumes required in particular fields.

In one embodiment the resin system is allowed to harden after the proppant blend is placed in the formation fractures. During the resin hardening process, a sufficient amount of fluid pressure is maintained on the resin-coated particulate blend to ensure that substantially all of the coated proppant material remains in the formation fractures. The hardened resin composition operates to consolidate the proppant materials in the formation fractures to thereby provide high permeability flow paths within the formation which resist particulate migration.

An alternative embodiment of the fracturing method comprises the steps of: fracturing a formation by pumping a viscous liquid into the formation at a pressure and rate sufficient to fracture the formation; continuing to pump the viscous fracturing fluid into the formation until a desired fracture geometry is obtained; pumping a treating composition of the type described hereinabove into the resulting fracture(s) such that the particulate blend deposits in and fills the fracture(s); and, assuming that the treating composition includes some type of bonding resin system, allowing the resin composition to harden. In certain applications it is possible to precoat the proppant with the resin offsite and the coated proppant is brought to the well in a dry state.

In the procedural application of this process, the resin-coated proppant suspended in the fluid carrier passes through the well into the formation and is permitted to pass into the fissures. The particles settle in the fissures causing contact between the polymer coated portion of the solid component of the injected fluids, which permits the binding reaction to occur as a consequence of the polymerization reaction. As the polymerization occurs water is produced, but this water is removed by the ester which is incorporated in the resin fluid, which induces the polymerization reaction to go forward. By application of the above procedure and employing the above described materials, a stable permeable consolidated structure is formed which is resistant to high temperatures and the fluids ordinarily encountered in subterranean petroleum-containing formations including those being subjected to steam flooding, while at the same time retaining sufficient permeability that formation fluids pass through the consolidated mass into the production well.

To further illustrate the invention, Applicants present the following experiment and hypothetical pilot field test to illustrate the process described above, although this is supplied for the purposes of complete disclosure and is not intended to be in any way limitative of the scope of our invention.

EXPERIMENTAL

For the purpose of demonstrating the operability of our process resin-coated sand was prepared under laboratory conditions. The following procedure was used to prepare the resin coated sand.

A resin mixture was prepared by saturating butyl acetate ester with o-nitrobenzoic acid. This required about 99 parts of butyl acetate to one part o-nitrobenzoic acid. This mixture was added to the resin with the volume ratio of ester mix to resin being $20/80$.

The mixture of resin, ester and nitrobenzoic acid was mixed with relatively clean sand in the ratio of 10 parts of resin mix to 90 parts sand. The resin mix and sand were mixed in a laboratory mixer until the sand was coated with the resin mix. The resin coated sand was placed in a saturated solution of sodium chloride in water and then packed into a section of pipe which was 6 in. long and 1.5 inches in diameter. The pipe was capped and placed in a laboratory oven at 300° F. The pipe was opened and the contents were examined and found to be well consolidated while still retaining sufficient permeability to permit fluid flow.

Based on these results, a scaled-up model of the method of our invention was tested. This test consisted of partially filling a large vat (20 inches diameter, 26 inches height) with four 100 lb. bags of Ottawa sand packed around tubing designed to deliver the coated sand into the Ottawa sand. The Ottawa sand was then saturated with a combination of 2 gallons Kern crude and 8 gallons water. The vat's contents were then heated to 250° F. The resin mixture used to coat the sand was prepared as follows: An o-nitrobenzoic acid saturated butyl acetate solution was added to the resin in a weight of 20 parts ester to 80 parts resin. The resin mix was then added to the uncoated sand in a ratio of 5 parts resin to 100 parts sand by volume and stirred until thoroughly coated. A liter of coated sand was prepared, placed in a saturated sodium chloride solution and pumped into the vat. The temperature in the vat was then maintained for 24 hrs.

HYPOTHETICAL PILOT FIELD EXAMPLE

The resin-coated particles produced by the above method may be used as proppants in hydraulic fracturing. In carrying out a hydraulic fracturing operation, a fracture is first generated by injecting a viscous fluid into the formation at a sufficient rate and pressure to cause the formation to crack or fracture. A carrier fluid having the proppant suspended therein is then pumped into the developing fracture until the desired fracture size has been achieved. The carrier fluid can return back out of the wellbore or bleed off into the formation depositing the propping agent in the fracture.

For this example, a total of 1000 cubic feet of resin coated proppant would be positioned in the fracture. In order to accomplish this, a total of 1000 cubic feet of sand having a commonly used particle size range of 20/40 mesh is obtained, washed and dried. Several mixing tanks would be positioned on the surface along with a mixer which is utilized for the step of coating the proppant with the resin at the well site. The resin employed in the procedure is QO1300 obtained from QO Chemicals. This is an oligomer of furfuryl alcohol, which applicants have found to be especially suitable for use in the process of this invention. In order to properly coat all of the 1000 cubic feet of sand employed in this process, a total of 75 gallons of this resin solution are required.

75 Gallons of the resin solution is formulated by mixing 60 gallons of the above described resin with 15 gallons of butyl acetate saturated with nitrobenzoic acid. The resin solution is prepared by first saturating the ester with o-nitrobenzoic acid and then mixing four parts of resin to this fluid mixture.

The proppant particles are then mixed with the resin solution in the ratio of one part by volume resin mix to 10 parts by volume sand. Mixing requires less than 5 minutes in order to ensure complete coating of the sand grains with the resin, after which the resin coated sand is added to a tank containing essentially saturated salt water which also contains 80 lbs. hydroxyethylcellulose per 1000 gal. of water and 0.01 percent by weight fluorescent dye to provide the needed viscosity for placement of the resin coated sand grains in the formation. This mixture, comprising the saturated salt carrier fluid and the suspended resin coated proppant are then pumped down the wellbore and into the fractures.

The above procedure is continued until the total desired amount of resin coated proppant has been formed, suspended in the brine carrier fluid and injected into the well where the particles establish the required grain to grain contact as the excess fracturing fluid leaks off into the formation. After the coated proppant has been injected, the well is shut-in for a period of time sufficient for the resin material to polymerize, binding the proppant particles together while still maintaining sufficient permeability to permit passage of fluid therethrough.

As the pressure within the fracture approaches the normal formation pressure, the fracture walls close in on the proppant and apply an overburden stress thereto. The strength imparted by the coating helps maintain the integrity of the proppant. Initially, the furan resin crosslinks and fuses, forming a three dimensional permeable matrix which is porous to the oil or gas. As the temperature increases the polymerization reaction proceeds until the resin is cured into an insoluble and infusible cross-linked state.

This curable resin coating can be pre-applied to the proppant, applied on-the-fly during pumping of the treatment, or applied subsequently using a variety of carrier fluids or by dump bailing.

Although our invention has been described in terms of specific preferred embodiments and examples which Applicants believe to include the best mode for applying their invention known to applicants at the time of this application, it will be recognized to those skilled in the art that various changes may be made in the composition and methods described herein without departing from the true spirit and scope of our invention which is defined more precisely in the claims appended hereinafter below:

We claim:

1. In a method for consolidating proppant injected into a hydraulic fracture adjacent a wellbore for increasing permeability and producing to the earth's surface hydrocarbon fluids comprising the steps of:

a) fracturing about the well penetrating into the subterranean formation to form fractures for increased production of the hydrocarbon fluids;

b) injecting a proppant coated with resin in a fracturing fluid into said fractures for holding open said fractures for increased production of said hydrocarbon fluids; and c) employing a consolidating fluid for consolidating said proppant downhole;

the improvement which comprises:

d) injecting proppant coated with an oligomer of furfuryl alcohol, an oil soluble, slightly water soluble organic acid selected from the group consisting of nitrobenzoic acid, toluene sulfonic acid, oxalic acid and benzoic acid, and an alkyl alkanoate to consume water produced by the polymerization of the resin, wherein said furfuryl alcohol oligomer forms a sticky coating on said proppant;

e) suspending said coated proppant, acid catalyst and alkyl alkanoate in a carrier fluid comprising water which is from 70% to 100% saturated with sodium chloride;

f) forming a fluid mixture of furfuryl alcohol oligomer coated proppant, acid catalyst, alkyl alkanoate, and carrier fluid;

g) introducing the fluid mixture comprising the oligomer coated proppant, acid catalyst, and alkyl alkanoate suspended in the carrier fluid into fracture and forming the cured consolidated proppant particles in the fracture to prop the fracture open.

2. The method of claim 1 wherein the proppant is treated with oligomer, acid catalyst and alkyl alkanoate prior to delivery to the well site.

3. The method of claim 1 wherein the acid catalyst is added "on-the-fly" at the well site as the proppant and carrier fluid are injected.

4. The method of claim 1 wherein the furfuryl alcohol oligomer, acid catalyst and alkyl alkanoate are added after the proppant is in place in the fracture.

5. A method as in claim 1 wherein the resin-coated proppant is prepared by adding proppant to a resin solution in the volume ratio of from 99 to 80 parts proppant to one part resin solution.

6. A method as recited in claim 1 wherein the ester is selected from ethyl acetate, methyl acetate, propyl acetate and butyl acetate.

7. A method as recited in claim 6 wherein the ester is butyl acetate.

8. A method as recited in claim 1 wherein the concentration of alkyl alkanoate in the resin fluid is from 10 to 60 percent by weight.

9. A method as recited in claim 1 wherein the organic acid is selected from o-nitrobenzoic acid, toluenesulfonic acid, oxalic acid and benzoic acid.

10. A method as recited in claim 9 wherein the organic acid in the resin fluid is toluenesulfonic acid.

11. A method as recited in claim 1 wherein the concentration of organic acid in the resin fluid is from 0.5 to 5.0 percent by weight.

12. A method as recited in claim 1 wherein the carrier fluid also contains ammonium hydroxide.

13. A method as in claim 1 wherein the proppants are selected from the group consisting of sand, glass beads, nut shells, metallic pellets or spheres, gravel, synthetic resin pellets or spheres, gilsonite, coke, sintered alumina, sintered bauxite, other ceramics, and mullite and combinations thereof.

14. A method as in claim 13 wherein the proppant is sand.

15. A method as in claim 1 wherein a viscosifying amount of hydrophilic polymer is added to the saturated salt water employed as a carrier fluid.

16. A method as in claim 15 wherein the hydrophilic polymer is hydroxyethyl cellulose.

17. A method as in claim 1 further comprising the use of a viscosity enhancing agent selected from the group consisting of fluorescent dyes or optical brighteners.

18. In any method employing resin coated proppant in a carrier fluid for injection into a fracture adjacent a wellbore, the improvement of using an oligomer of furfuryl alcohol to coat the proppant.

* * * * *